(12) United States Patent
Malka

(10) Patent No.: US 9,259,788 B2
(45) Date of Patent: Feb. 16, 2016

(54) PARTING BLADE AND BLADE HOLDER CONFIGURED FOR CONVEYANCE OF PRESSURIZED COOLANT

(75) Inventor: Asaf Malka, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 552 days.

(21) Appl. No.: 13/482,761

(22) Filed: May 29, 2012

(65) Prior Publication Data

US 2013/0236253 A1 Sep. 12, 2013

Related U.S. Application Data

(60) Provisional application No. 61/607,366, filed on Mar. 6, 2012.

(51) Int. Cl.
| B27B 27/10 | (2006.01) |
| B23B 27/10 | (2006.01) |
| B23B 27/08 | (2006.01) |
| B23B 29/04 | (2006.01) |

(52) U.S. Cl.
CPC .............. *B23B 27/10* (2013.01); *B23B 27/086* (2013.01); *B23B 29/043* (2013.01); *B23B 2205/02* (2013.01); *B23B 2250/12* (2013.01); *Y10T 407/14* (2015.01)

(58) Field of Classification Search
CPC ....................................................... B23B 27/10
USPC ............................. 407/11, 67, 109, 110, 117
See application file for complete search history.

(56) References Cited

U.S. PATENT DOCUMENTS

| 3,596,337 | A | * | 8/1971 | Arnold et al. ................... 407/86 |
| 3,599,303 | A | * | 8/1971 | Sletten .............................. 29/25 |
| 3,798,725 | A | * | 3/1974 | Hanson ........................... 407/11 |
| 4,008,631 | A | * | 2/1977 | Hahn et al. ..................... 82/1.11 |
| 4,695,208 | A | * | 9/1987 | Yankoff ........................ 407/106 |
| 4,955,264 | A | * | 9/1990 | Armbrust ........................ 82/158 |
| 5,031,492 | A | | 7/1991 | Zinner |
| 2006/0257217 | A1 | | 11/2006 | Berminge |
| 2007/0110526 | A1 | * | 5/2007 | Nicholas ....................... 407/110 |
| 2010/0135736 | A1 | | 6/2010 | Hecht |
| 2012/0230780 | A1 | * | 9/2012 | Henry et al. .................... 407/11 |

FOREIGN PATENT DOCUMENTS

| DE | 812679 U1 | 3/1983 | |
| DE | 3434653 A1 * | 4/1985 | .............. B23B 27/10 |
| DE | 3429842 A1 * | 2/1986 | .............. B23B 27/10 |

* cited by examiner

*Primary Examiner* — Will Fridie, Jr.
*Assistant Examiner* — Ryan Rufo
(74) *Attorney, Agent, or Firm* — Womble Carlyle Sandridge & Rice PLLC

(57) ABSTRACT

A cutting tool assembly includes a parting blade and a blade holder for holding same. The cutting tool assembly is configured for conveying pressurized coolant via the blade holder to a cutting portion of the parting blade. The blade holder includes a deceleration chamber configured for reducing impact of the pressurized coolant against the parting blade.

30 Claims, 5 Drawing Sheets

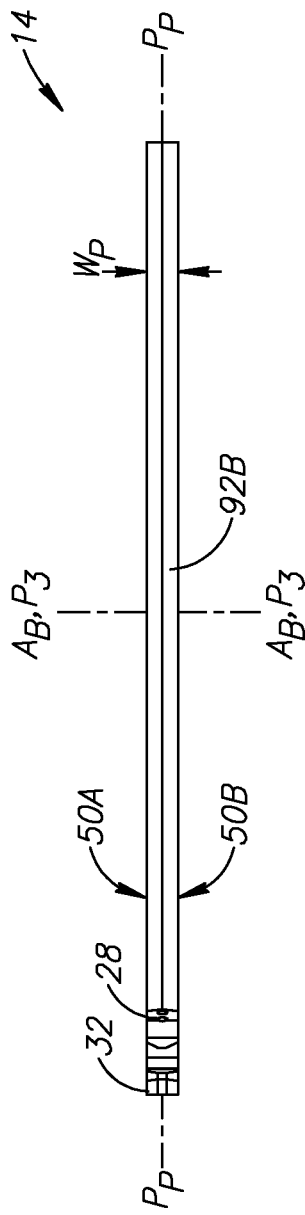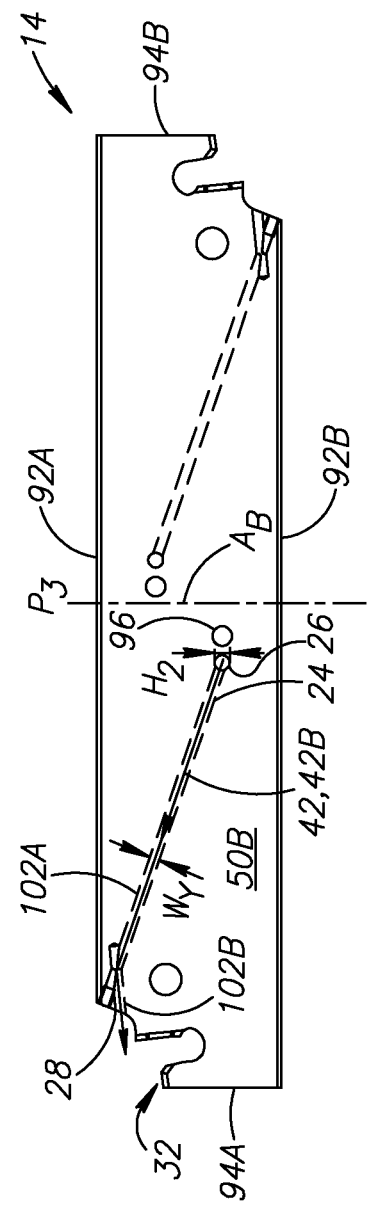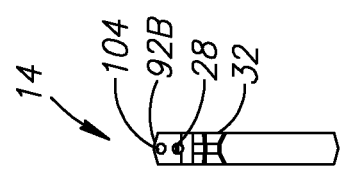

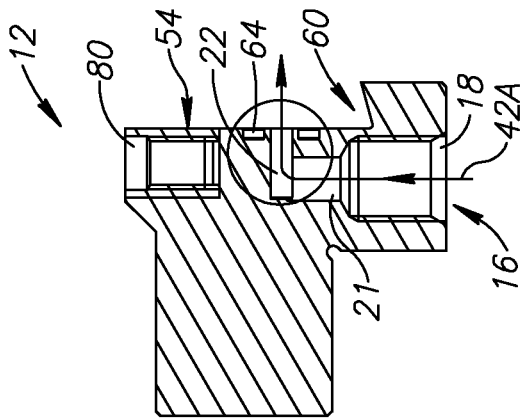
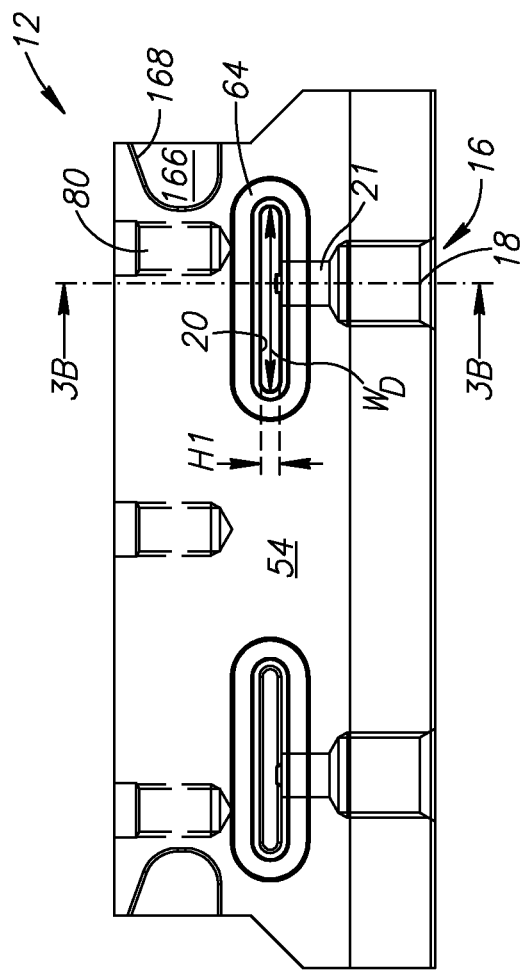
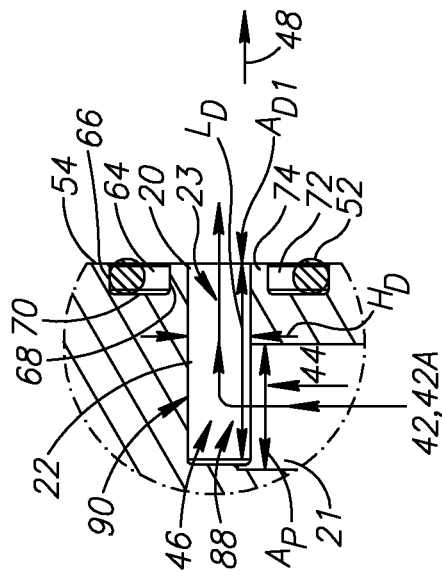
FIG.3B
FIG.3A
FIG.3C

PARTING BLADE AND BLADE HOLDER CONFIGURED FOR CONVEYANCE OF PRESSURIZED COOLANT

RELATED APPLICATIONS

The present application claims priority to U.S. Provisional Patent Application No. 61/607,366, filed 6 Mar. 2012. The contents of the aforementioned application are incorporated by reference in their entirety.

FIELD OF THE INVENTION

The subject matter of the present application relates to a cutting tool assembly configured for conveyance of coolant, in particular, a cutting tool assembly comprising a parting blade and blade holder configured for conveyance of pressurized coolant to a cutting portion of the parting blade.

BACKGROUND OF THE INVENTION

As the name suggests, parting blades can be considered to have a 'blade' shape. More specifically, parting blades can have narrow elongated bodies, configured for metal-cutting operations, in particular parting and slitting operations. Such parting blades comprise a cutting portion. The cutting portion is associated with a cutting edge that could be part of a parting blade cutting insert that is detachably or permanently mounted to an insert seat formed at the cutting portion, or, alternatively, the cutting edge could be integrally formed on the body of the parting blade itself.

Cutting tool assemblies of the type in question can be configured to hold parting blades along the periphery thereof, via the use of opposing jaws of a blade holder, which can typically be configured to allow sliding motion of the parting blade relative to the blade holder.

One known parting blade and blade holder are configured for conveyance of pressurized coolant, at a pressure of less than about 20 bar, to cool a cutting edge of a cutting insert mounted on the cutting portion of the parting blade. Such parting blade comprises two coolant passageways opening out to a single cutting portion of the parting blade for directing coolant at two different sides of a cutting insert mounted on the blade.

It is known that cutting tool assemblies that convey coolant at a pressure higher than they are designed for are susceptible to leakage of the coolant and/or damage.

SUMMARY OF THE INVENTION

In accordance with a first aspect of the subject matter of the present application, there is provided a blade holder comprising a holder passageway. The holder passageway comprises a deceleration chamber associated with a holder outlet aperture of the blade holder. The deceleration chamber is configured to reduce the speed of coolant conveyed therethrough.

One possible advantage of such deceleration is the reduction of impact of coolant exiting the holder outlet aperture on the parting blade. Reduced impact of coolant on a parting blade, in particular a peripherally held parting blade, can reduce the likelihood of leakage of the coolant.

One way that the deceleration chamber can be configured for such reduction of speed, generally speaking, is by having a cross-sectional area or volume that is greater than a cross-sectional area or volume of a preceding portion of the holder passageway. The relatively increased cross-sectional area or volume, in theory, enables pressure reduction in the deceleration chamber.

Alternatively or additionally, the deceleration chamber can be configured for such reduction of speed by comprising a barrier surface facing the coolant path of the preceding portion of the holder passageway. Deflection of coolant entering the deceleration chamber, in particular deflection in a direction at least partially, or directly, opposing the entry direction of the coolant, can, in theory, reduce speed of coolant through the chamber.

More precisely, there is provided a blade holder comprising a blade seat.

The blade seat can comprise a holder connection surface and longitudinal jaws disposed on opposing sides of the holder connection surface.

The blade holder can also comprise a holder passageway configured for conveyance of coolant and comprising a coolant path extending therethrough from a holder inlet aperture to a holder outlet aperture formed at the holder connection surface.

The holder passageway can comprise a preceding portion and a deceleration chamber closer than the preceding portion to the holder outlet aperture, and a transition region at which the preceding portion transforms into the deceleration chamber.

In the preceding portion at the transition region, the holder passageway has a preceding portion cross-sectional area extending perpendicular to the coolant path.

In the deceleration chamber at the transition region, the holder passageway has a deceleration chamber cross-sectional area extending perpendicular to the coolant path.

Wherein: the deceleration chamber cross-sectional area is greater than the preceding portion cross-sectional area; and/or the deceleration chamber comprises a barrier surface facing the coolant path of the preceding portion at the transition region.

In accordance with another aspect of the subject matter of the present application, there is provided an elongated parting blade comprising: opposing first and second side surfaces extending between parallel first and second longitudinal mounting edges and between opposing first and second end edges which extend transverse to the longitudinal mounting edges; a cutting portion which is associated with the first longitudinal mounting edge and the first end edge; and a blade passageway configured for conveyance of coolant and extending from a blade inlet aperture formed in at least one of the side surfaces to a single blade outlet aperture located at the cutting portion.

In accordance with still another aspect of the subject matter of the present application, there is provided a cutting tool assembly that includes a parting blade and a blade holder for holding same.

The cutting tool assembly can have any of the features described above or below in connection with the other aspects.

It is understood that the above-said is a summary, and that any of the aspects above may further comprise any of the features described in connection with any of the other aspects or described hereinbelow. For example, the following features may be applicable to any of the above aspects of the subject matter of the present application:

A. The coolant can be of any suitable fluid type, for example water, oil, or a mixture thereof.

B. The cutting tool assembly and components thereof can be configured for conveyance of coolant at a pressure in excess of 20 bar. The cutting tool assembly and components thereof can be configured for conveyance of coolant at a pressure of 120 bar or greater.
C. The cutting tool assembly can be of a simple construction, i.e. comprising a limited number of parts, for example as can be counted in the description below.
D. The cutting tool assembly can be of a compact construction. For example, the cutting tool assembly or components thereof can have an elongated construction.
E. The number of turns of the flow path in the blade holder can be a single turn. The number of turns of the flow path in the parting blade can be a single turn. There can be a single turn only where coolant enters the parting blade.
F. The holder outlet aperture can comprise a cross-sectional area configured to maintain or further reduce the speed of the coolant from the deceleration chamber. For example, the cross-sectional area of the holder outlet aperture can correspond to a cross-sectional area of the deceleration chamber extending perpendicular to the coolant path adjacent the holder outlet aperture. Alternatively, the deceleration chamber's cross-sectional area, extending perpendicular to the coolant path, could also increase with increased proximity to the holder outlet aperture. Such increase could, in theory, further reduce the speed of the coolant flow.
G. The blade holder can be configured to hold the parting blade only along the periphery thereof.
H. The parting blade's body can be a unitary one-piece construction (i.e. the term "body" excluding separately manufactured components such as cutting inserts and sealing devices, etc.).
I. The parting blade's blade outlet aperture can be a fixed distance from the insert seat of the parting blade.
J. The parting blade's blade outlet aperture can be located at a portion of the cutting portion that is closer to the first longitudinal mounting edge than the first end edge.
K. The parting blade's blade passageway can have a uniform cross-sectional area perpendicular to a coolant path extending therethrough. Alternatively, the blade passageway can have maximum and minimum cross-sectional areas. The maximum cross-sectional area can be greater in magnitude and closer to the blade inlet aperture than the minimum cross-sectional area. The magnitude of the maximum cross-sectional area can be less than twice a magnitude of the minimum cross-sectional area.
L. The parting blade can comprise an additional blade passageway configured for conveyance of coolant extends from an additional blade inlet aperture formed in at least one of the side surfaces to an additional single blade outlet aperture formed at an additional cutting portion.
M. The blade inlet aperture can open out to both of the first and second side surfaces.
N. The parting blade can comprise a sealing aperture adjacent to the blade inlet aperture that opens out to both of the first and second side surfaces.
O. The parting blade can comprise an additional cutting portion. The additional cutting portion can be associated with the second longitudinal mounting edge and the second end edge.
P. The parting blade can be symmetrical about a bisecting plane extending parallel with and equally spaced from the first and second side surfaces. The parting blade can have 180 degrees rotational symmetry about a blade axis that extends through the center of, and in a direction perpendicular to, the first and second side surfaces.
Q. The parting blade can have minor symmetry about a lateral plane extending perpendicular to the first and second side surfaces and located midway between the opposing first and second end edges. Such construction can result in a double-ended parting blade which is not rotationally symmetric about a blade axis that extends through the center of, and in a direction perpendicular to, the first and second side surfaces.
R. The parting blade's first and second side surfaces can be planar.
S. A width $W_Y$ of the blade passageway may be greater than 50%, or even 64%, of a width $W_P$ of the parting blade ($W_Y > 0.5 W_P$; $W_Y > 0.64 W_P$). In some embodiments the width $W_Y$ of the blade passageway may be less than 70% of the width $W_P$ of the parting blade ($W_Y < 0.7 W_P$).
T. The deceleration chamber's cross-sectional area can be at least 1.5 times as large as the preceding portion's cross-sectional area. The deceleration chamber's cross-sectional area can be at least 2 times as large, or even at least 2.6 times as large as the preceding portion's cross-sectional area. For the purpose of the specification and claims, unless stated to the contrary, discussion of cross-sectional areas of the passageways relates to cross-sectional areas that are perpendicular to the flow path therethrough.
U. The deceleration chamber can open out to the holder outlet aperture.
V. The coolant path of the blade holder can comprise a change of direction from the holder inlet aperture to the holder outlet aperture. The change of direction from the holder inlet aperture to the holder outlet aperture can be a quarter turn. The change of direction from the holder inlet aperture to the holder outlet aperture can occur at the deceleration chamber. The change of direction can be the only change of direction of the coolant path of the blade holder.
W. The holder outlet aperture can have a holder outlet cross-sectional area extending perpendicular to the coolant path and having the same magnitude as an exit cross-sectional area of the deceleration chamber that extends perpendicular to the coolant path at a point along the coolant path after the change of direction.
X. The holder connection surface can be formed with a sealing element recess that surrounds the holder outlet aperture. A sealing element can be mounted in the sealing element recess. One or more of (a) the sealing element recess, (b) a sealing element configured to fit in the sealing element recess, and (c) the holder outlet aperture can be elongated along a longitudinal direction of the blade holder, and can be preferably oval shaped.
Y. Defined between the sealing element recess and the holder outlet aperture can be a holder outlet aperture wall. Such wall can, possibly, protect the sealing element above certain pressures.
Z. A smallest dimension of the deceleration chamber can extend from the transition region to the barrier surface. It will be understood that with reduction of said dimension, the effect of the barrier surface may be increased. A change in direction of the coolant path can be caused by deflection of the coolant path at the barrier surface.
AA. The cutting tool assembly can be configured for movement of the parting blade in the blade holder that is restricted by location of the sealing element and the parting blade. The movement can be restricted to a location(s) of one or more sealing apertures of the parting blade.

BB. The cutting tool assembly can comprise a removable sealing device for each sealing aperture formed in the blade.

CC. The cutting tool assembly can be free of a clamping element configured to force the parting blade against the holder connection surface.

DD. The longitudinal jaws can be the outermost portions of the blade holder in an outward direction from the holder connection surface.

BRIEF DESCRIPTION OF THE DRAWINGS

For a better understanding of the subject matter of the present application, and to show how the same may be carried out in practice, reference will now be made to the accompanying drawings, in which:

FIG. 2A is a side view of the parting blade in FIGS. 1A to 1C, with internal elements relating to the coolant path being shown;

FIG. 2B is an end view of the parting blade in FIG. 2A;

FIG. 2C is a plan view of the parting blade in FIGS. 2A and 2B;

FIG. 3A is a side view of the blade holder in FIGS. 1A to 1C, excluding one of the longitudinal jaws and with some internal elements shown in broken lines;

FIG. 3B is a cross section view taken along line 3B-3B in FIG. 3A; and

FIG. 3C is an enlarged view of an encircled portion in FIG. 3B, further including a sealing element mounted thereto.

DETAILED DESCRIPTION

Figure 1A:
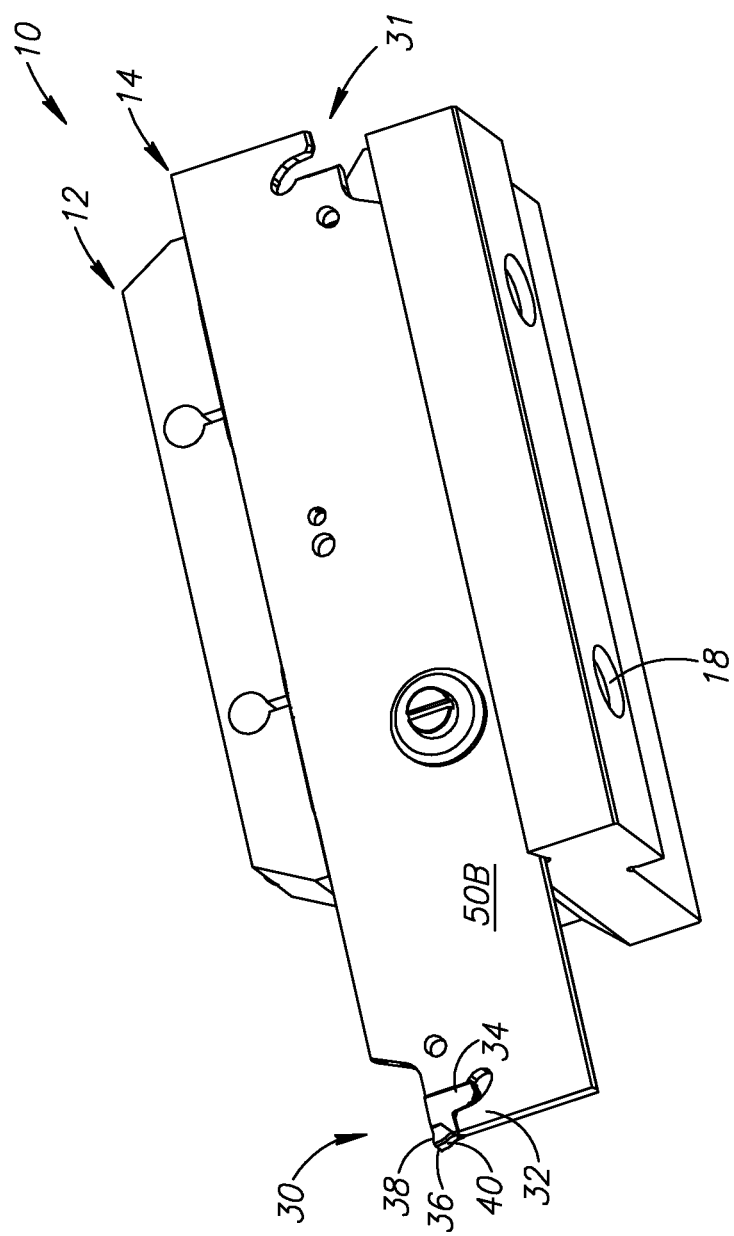
FIG. 1A is a perspective view of a cutting tool assembly including a blade holder, a parting blade, a cutting insert, and a sealing element.

Reference is made to the figures, which illustrate a cutting tool assembly 10 configured for parting or slitting a metal workpiece (not shown) which will first be briefly described to provide a general understanding of the operation thereof.

The cutting tool assembly 10 comprises a blade holder 12 and a parting blade 14 mounted thereon.

The blade holder 12 comprises a holder passageway 16 for passage of coolant therethrough. The holder passageway 16 extends from a holder inlet aperture 18 to a holder outlet aperture 20, and comprises a preceding portion 21 and a deceleration chamber 22 that is closer than the preceding portion 21 to the holder outlet aperture 20. It will be understood that the preceding portion 21 and deceleration chamber 22 are configured relative to one another so that fluid entering the holder inlet aperture 18 decreases in velocity by the time it exits at the holder outlet aperture 20.

The holder inlet aperture 18 is connectable to a coolant supply pipe (not shown), which in turn is connected to a coolant supply source (not shown). The cutting tool assembly 10 is configured, in this example, for conveyance of coolant at pressures of at least 20 bar, for example up to 120 bar. However, it will be understood that the subject matter of the present application could be configured for conveyance of coolant at even higher than 120 bar. It will also be understood that a cutting tool assembly or components thereof, which are configured to operate with coolant above a certain pressure threshold system (for example a threshold above 20 bar) could also work at pressures lower than such threshold, if desired.

The holder outlet aperture 20 is in fluid communication with a blade passageway 24 of the parting blade 14.

The blade passageway 24 extends from a blade inlet aperture 26 to a blade outlet aperture 28 located at a cutting portion 30 of the parting blade 14.

The cutting portion 30 can comprise an insert seat 32, configured for receiving a cutting insert 34.

Figure 1B:
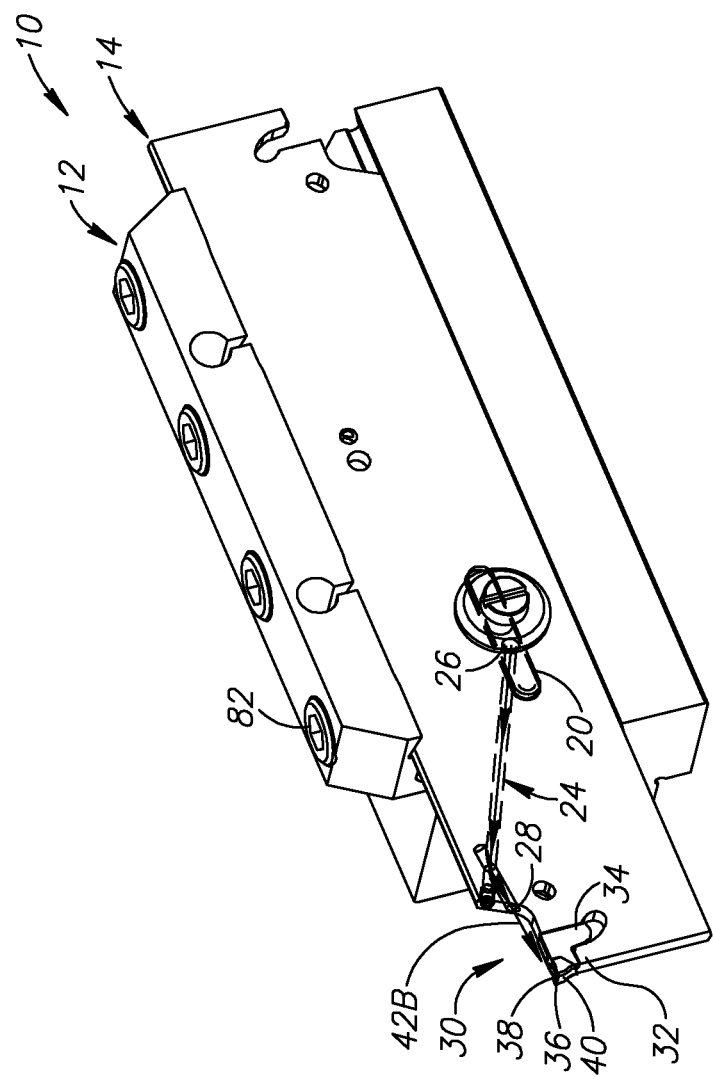
FIG. 1B is another perspective view of the cutting tool assembly of FIG. 1, with internal elements relating to the coolant path shown in broken lines.
Figure 1C:
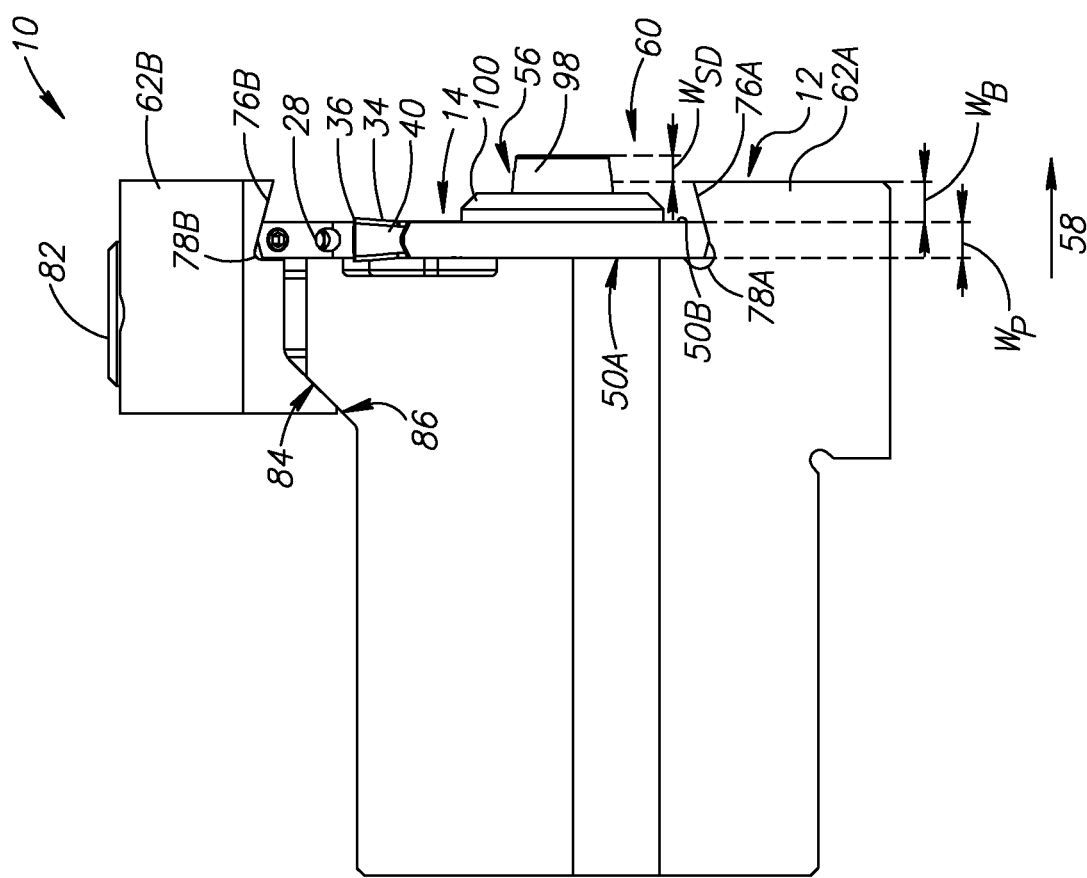
FIG. 1C is an end view of the cutting tool assembly of FIGS. 1A and 1B.

The cutting insert 34 comprises a cutting edge 36 at an intersection of a rake surface 38, over which chips (not shown) from a cut workpiece (not shown) flow, and relief surface 40 thereof. As shown in FIG. 1C, the cutting edge 36 is wider than a width $W_B$ of a remainder of the parting blade 14, or at least the portion thereof that projects from the blade holder 12, for achieving slitting and/or parting operations.

Drawing attention to FIGS. 3A to 3C, in operation, coolant (not shown) is conveyed to the holder inlet aperture 18, for example at a pressure of 120 bar, which follows a coolant path 42 defined by the holder passageway 16 and the blade passageway 24. For ease of description, the coolant path 42 is divided into a first path portion 42A defined by the holder passageway 16, and a second path portion 42B (FIGS. 1B and 2A) defined by the blade passageway 24.

The holder passageway 16, and hence first path portion 42A, extends in a first direction, shown by the arrow designated as 44, and then, at a location generally designated by arrow 46, turns a certain amount, which in this non-limiting example is a quarter turn, and extends in a second direction, shown by the arrow designated as 48, and exits the holder outlet aperture 20.

As coolant exits the holder outlet aperture 20, it impacts one of the blade side surfaces 50A, 50B of the parting blade 14, in particular the closer blade side surface 50A, and is contained within the boundaries of a sealing element 52 (FIG. 3C), which surrounds the holder outlet aperture 20 and sealingly engages the closer blade side surface 50A.

Notably, the coolant decelerates upon reaching the deceleration chamber 22, thereby reducing the above-mentioned impact on the parting blade 14. It is understood that such impact applies a force on the parting blade 14 which, if great enough in magnitude, could space the proximal blade side surface 50A apart from an opposing holder connection surface 54, as well as the associated sealing element 52, and cause undesired leakage of the coolant. Accordingly, deceleration of the coolant in the deceleration chamber 22 is configured to reduce the force applied to the parting blade 14.

After exiting the blade holder 12, the coolant follows the second path portion 42B, i.e. entering the blade inlet aperture 26, exiting the blade outlet aperture 28, passing above the rake surface 38 of the cutting insert 34 in a direction towards the cutting edge 36, for cooling the cutting edge 36 and/or the workpiece (not shown) being slit or parted.

Components of the cutting tool assembly 10 will now be described in further detail to provide additional understanding of advantages thereof.

Referring to FIGS. 1A to 1C and 3A, the blade holder 12 is elongated. It will be understood that such elongation can provide for, in an end view thereof (FIG. 1C) a compact design.

To elaborate, as best shown in FIG. 1C, the blade holder 12 and sealing device 56 do not significantly protrude past the parting blade 14 in the direction of arrow 58. More specifically, in this example, the blade holder 12 protrudes past the parting blade 14, by a blade holder width $W_B$, which has an equivalent magnitude as that of the parting blade width $W_P$.

The outermost projecting part of the cutting tool assembly 10 is the sealing device 56, which protrudes a width $W_{SD}$ from the blade holder 12 of corresponding magnitude to the parting blade width $W_P$. To bring the widths into perspective, in the present example the sealing device protrudes 4.6 mm from the outermost surface 50B of the parting blade 14. For cutting tool assemblies 10 of similar construction, except with blades of different sizes, the parting blade width $W_P$ is the only expected, significantly varying width of those mentioned. Accordingly, the maximum lateral projection of the cutting tool assembly 10 from the outermost blade side surface 50B can be expected to be less than 5 mm. The width $W_Y$ (FIG. 2A) of the blade passageway 24 (which may be a diameter, when the blade passageway 24 has a circular cross-section) may be commensurate with the parting blade width $W_P$. For example, in some embodiments, the width $W_Y$ of the blade passageway 24 may be greater than 50%, or even 64%, of the width $W_P$ of the parting blade ($W_Y > 0.5\ W_P$; $W_Y > 0.64\ W_P$). In some embodiments the width $W_Y$ of the blade passageway 24 may be less than 70% of the width $W_P$ of the parting blade ($W_Y < 0.7\ W_P$).

It will be understood that a cutting tool assembly free of a protruding lateral projection can, in at least some applications, allow an increased lateral motion of the cutting tool assembly and hence cutting range thereof.

The blade holder 12 further comprises a blade seat 60 configured for seating the parting blade 14. The blade seat 60 can comprise the holder connection surface 54 and first ("lower") and second ("upper") longitudinal jaws 62A, 62B disposed on opposing sides of the holder connection surface 54. The holder outlet aperture 20 is formed in the holder connection surface 54 and is located closer to the first longitudinal jaw 62A than to the second longitudinal jaw 62B. As seen from FIGS. 1B, 1C, 3A, and 3B, the upper longitudinal jaw 62B is secured by screws 82 to mounting bores 80 formed in the body of the blade holder, and thus can be considered as "removable" longitudinal jaw 62B, while the lower longitudinal jaw 62A can be considered a "fixed" longitudinal jaw 62A.

The holder connection surface 54 can be planar to allow sliding motion of the parting blade 14 therealong. The holder connection surface 54 can further be formed with functional recesses. In particular, the holder connection surface can be formed with a sealing element recess 64 surrounding an associated holder outlet aperture 20. The holder connection surface 54 can also be formed with a cutting insert accommodation recess 166, for accommodating certain types of cutting inserts mounted on a parting blade. In this example, the cutting insert accommodation recess 166 has a U-shaped peripheral wall 168.

The sealing element recess 64 can be elongated, for example oval-shaped. Such elongation can allow movement of the parting blade 14 whilst maintaining a coolant sealed construction. It will be understood that in consideration of space constraints of the holder connection surface 54, the sealing element recess 64 could be other regular shapes, non-regular shapes, or even non-elongated shapes such as a circle etc.

One possible advantage of forming a sealing element recess on the holder connection surface 54 instead of on the parting blade 14 or, stated differently, having planar first and second side surfaces 50A, 50B of a parting blade 14, can be that the relatively thin elongated parting blades are not weakened.

Drawing attention to FIG. 3C, the sealing element recess 64 can have an outer peripheral surface 66, an inner peripheral surface 68, and a base surface 70 connecting the outer and inner peripheral surfaces 66, 68.

The sealing element 52 can be mounted in the sealing element recess 64. The sealing element 52 can have a corresponding shape to the sealing element recess 64, which in this example is oval-shaped. The sealing element 52 can be sized to be biased against the outer peripheral surface 66 and base surface 70 of the sealing element recess 64. The sealing element 52 can be sized to protrude from the holder connection surface 54, for contacting the parting blade 14. A gap 72, located between the sealing element 52 and one of the surfaces of the sealing element recess 64, which in this example is the inner peripheral surface 68, can allow for expansion of the sealing element 52 within the sealing element recess 64. Such gap 72 can possibly prevent undesired spacing of the parting blade 14 in a direction away from the blade holder 12.

Defined between the inner peripheral surface 68 and the holder outlet aperture 20 is a holder outlet aperture wall 74. The holder outlet aperture wall 74 can protect the sealing element 52 from damaging pressurized coolant and/or direct coolant into the blade inlet aperture 26. Notably, the blade inlet aperture 26 can be sized to correspond to an internal height dimension H1 of the holder outlet aperture 20. More precisely, the blade inlet aperture's 26 internal height dimension H2, which in this example is also a diameter, can correspond in magnitude to the internal height H1 of the holder outlet aperture 20, for allowing efficient coolant transfer therebetween.

Referring to FIG. 1C, each of the first and second longitudinal jaws 62A, 62B can comprise a slanted biasing surface 76A, 76B for biasing the parting blade 14, peripherally, against the holder connection surface 54. Each of the first and second longitudinal jaws 62A, 62B can comprise a relief recess 78A, 78B located inward of the biasing surface 76A, 76B.

The first longitudinal jaw 62A can have a unitary construction with the remainder of the blade holder 12, except, in this example, with the second longitudinal jaw 62B.

The second longitudinal jaw 62B can be attached to the remainder of the blade holder 12 via at least one mounting bore 80 formed therein and in the blade holder 12 and secured with a screw 82. Each mounting bore 80 can be directed towards the deceleration chamber 22, as opposed to being oriented in the direction of arrow 58, the latter of which might, in some circumstances, cause an unwanted protrusion of a screw portion past the parting blade 14. Each mounting bore 80 can be a blind bore, restricted in length so as not to open out to or weaken an associated deceleration chamber 22. Additionally, each mounting bore 80 can be located spaced-apart from the sealing element recess 64 (best shown in FIG. 3B). The second longitudinal jaw 62B can also comprise a jaw securing surface 84, configured for being biased against a corresponding holder securing surface 86, for biasing the parting blade 14 against the holder connection surface 54.

Referring now to FIGS. 3A to 3C, it is shown that the holder passageway 16 can comprises a transition region 88 at which the preceding portion 21 transforms into the deceleration chamber 22. Including the transition region 88, the deceleration chamber 22 has a length $L_D$ along second direction 48.

One of the ways that the deceleration of coolant in the deceleration chamber 22 can occur can be a result of the deceleration chamber 22 having a greater cross-sectional area than a cross-sectional area of the preceding portion.

More precisely, the deceleration chamber 22 can comprise a deceleration chamber cross-sectional area $A_{D1}$, extending perpendicular to the first path portion 42A of the deceleration chamber 22 at the transition region 88, which is greater than a preceding portion cross-sectional area $A_P$ of the preceding portion 21 (which in this non-limiting example is a circle) at the transition region 88. In this example, the deceleration chamber cross-sectional area $A_{D1}$ is rectangular having a length dimension $L_D$ and a width dimension $W_D$, and accordingly fulfilling the condition $L_D \times W_D = A_{D1}$. While the design shown illustrates a deceleration chamber cross-sectional area $A_{D1}$ having a magnitude about 2.6 times as large as the preceding portion cross-sectional area $A_P$, it will be understood that a larger ratio would also provide the desired effect. Similarly, in theory, a ratio of 2:1 or a ratio at least greater than 1.5:1 is possibly feasible.

It will be understood that, referring to cross-sections perpendicular to a flow path, a cross-sectional area anywhere in the deceleration area which is greater than a cross-sectional area in the preceding portion could provide deceleration. However, a relatively greater cross-sectional area of the deceleration chamber 22 at the transition region 88 may be advantageous. In theory:

a relatively greater cross-sectional area of the deceleration chamber 22 at the transition region 88 may complement deceleration at the barrier surface 90;

deceleration at the start of the deceleration chamber 22 may decelerate the flow to a velocity which, even if there is an increase in velocity at a later section of the deceleration chamber 22, does not provide sufficient time for the flow to increase to the velocity of the preceding portion 21; stated differently, cross sectional areas in the deceleration chamber 22 subsequent to the preceding portion 21 may all be smaller than the cross-sectional area thereat; alternatively, even if the deceleration chamber 22 would have a cross-sectional area corresponding in size to the preceding portion 21, the deceleration chamber 22 may be sized such that flow does not increase to the velocity of the preceding portion 21 (e.g. sufficiently short in length in a direction of the flow path).

It will also be understood that, without specifying cross sections, the deceleration chamber 22 can be shaped (e.g. by having a larger volume or cross section than the preceding portion 21) to decelerate fluid from the preceding portion 21. It is also noted that the width dimension $W_D$ has a greater magnitude than the length dimension $L_D$, facilitating a possibly advantageous range of movement of the parting blade 14.

It is also noted that, in this example, the holder outlet aperture 20 comprises an identical cross-sectional area to the deceleration chamber 22. More precisely, a cross-sectional area of the holder outlet aperture 20 can correspond to a cross-sectional area of the deceleration chamber 22 extending perpendicular to the coolant path 42, 42A adjacent (generally designated with arrow 23) the holder outlet aperture 20.

Another way in which the deceleration of coolant in the deceleration chamber 22 can occur can be a result of the deceleration chamber 22 comprising a barrier surface 90 facing the first path portion 42A of the coolant path in the preceding portion 21 at the transition region 88. In theory, deflection of coolant in a direction against the first direction 44, and in this example, in an opposite direction to the first direction 44, can reduce the speed of coolant entering the deceleration chamber 22. It will be understood that increased proximity of the barrier surface 90 to the preceding portion 21 at the transition region 88 could result in a greater reduction of speed. In this example it is noted that the deceleration chamber 22 is configured with the smallest dimension thereof ($H_D$) extending from the preceding portion 21 at the transition region 88 to the barrier surface 90. To bring perspective to the proximity in the present example, it is noted that such height $H_D$, in this example is 2.5 mm. Such height $H_D$ could be increased, for example, for this particular design up to 3 mm, however at distances greater than 3 mm significant constructional modifications may be required. It will be understood that the height dimension $H_D$ of the deceleration chamber 22 at the transition region 88 may be the same as the internal height dimension H1 of the holder outlet aperture 20, though it is possible that they may differ slightly.

It will be understood that a combination of both construction concepts above, each being configured in achieving deceleration of coolant in a different way, can, possibly, provide greater deceleration than one of the constructions alone.

Referring now to FIGS. 1B and 2A to 2C, the parting blade 14 will be described in more detail.

The parting blade 14 can be elongated with opposing planar first and second side surfaces 50A, 50B extending between parallel first and second longitudinal mounting edges 92A, 92B and between opposing first and second end edges 94A, 94B which extend transverse to the longitudinal mounting edges 92A, 92B. The blade inlet aperture 26 is located closer to the second longitudinal mounting edge 92B than to the first longitudinal mounting edge 92A. Thus, the blade passageway 24 extends from a blade inlet aperture 26 that is closer to the second longitudinal mounting edge 92B than to the first longitudinal mounting edge 92A, to a blade outlet aperture 28 that is closer to the first longitudinal mounting edge 92B than to the second longitudinal mounting edge 92A. The blade inlet aperture 26 is located between the first and second longitudinal mounting edges 92A, 92B.

Each of the first and second longitudinal mounting edges 92A, 92B can have a tapered shape with slanted surfaces which can facilitate longitudinal sliding motion relative to the blade holder 12.

The parting blade 14 can have 180 degrees rotational symmetry about a blade axis ($A_B$) which extends through the center of, and in a direction perpendicular to, the first and second side surfaces 50A, 50B. Such construction can allow a single parting blade to comprise more than one cutting portion.

The parting blade 14 can be symmetrical about a bisecting plane $P_P$ extending parallel with and equally spaced from the first and second side surfaces 50A, 50B. Such construction can allow a single parting blade to be compatible for different cutting machines or cutting applications.

The parting blade 14 may have a lateral plane P3 which is perpendicular to the first and second side surfaces 50A, 50B, and is located midway between the end edges 94A, 94B. In some embodiments (not shown), the parting blade may have minor symmetry about the lateral plane P3, and thus be double-ended but not rotationally symmetric about the aforementioned blade axis ($A_B$).

In view of the above-mentioned symmetry, the following description will relate to only one of the blade passageways 24 and the cutting portion 30 associated therewith. Such symmetry is only intended to relate to the body of the parting blade body itself and not associated non-integral components such as cutting inserts (wherein typically only one is mounted at any given time to allow greater range of motion of the parting blade) or sealing devices, which are only needed in one of the plurality of possible positions therefor at a given time. The cutting portion 30 described below is the one associated with the first longitudinal mounting edge 92A and the first end edge 94A.

In this example, the blade inlet aperture 26 opens out to both the first and second side surfaces 50A, 50B.

To prevent coolant (not shown) exiting the blade inlet aperture 26 at the second side surface 50B, the parting blade 14 is provided with a sealing aperture 96 (FIG. 2A), which in this example is threaded, to which the sealing device 56 (FIG. 1C) can be fastened.

The sealing device 56 can be a screw 98 and annular seal 100, the latter of which can be made of a rigid material, for example metal. The screw 98 can extend through the annular seal 100 and can be fastened to the sealing aperture 96.

The sealing aperture 96 is adjacent to the blade inlet aperture 26, and the annular seal 100 extends over and seals the blade inlet aperture 26 to prevent coolant exiting therefrom.

The sealing device 56 can be configured to be detached from the parting blade 14 (in this example they are connected via threading), allowing it to be mounted to the other end of the same sealing aperture 96 or to another sealing aperture of the parting blade 14, when needed.

It has been found that it can be advantageous to restrict the movement of the parting blade 14 in the blade holder 12, in accordance with the location of the sealing element and the parting blade. In particular, it has been found that unrestricted motion of the parting blade 14, allowing one of the sealing apertures 96 to be disposed near or facing the sealing element 52, can result in undesired deflection of pressurized coolant. In theory, such deflection is believed to be caused by contact of the coolant with the sealing aperture 96 and/or the sealing device 56, onto the sealing element 52 causing damage thereto.

The blade passageway 24 has a uniform cross-sectional area perpendicular to the second path portion 42B which extends therethrough. One possibly advantageous construction of the blade passageway 24 can be production of a straight first sub-passageway 102A, starting at a first sub-passageway aperture 104 and extending to the blade inlet aperture 26, and production of a straight second sub-passageway 102B, starting at the blade outlet aperture 28 and extending to the first sub-passageway 102A. The second sub-passageway 102B can intersect the first sub-passageway 102A at an obtuse angle. The first sub-passageway aperture 104 is subsequently sealed to ensure coolant is directed from the blade inlet aperture 26 to the blade outlet aperture 28.

The straight second sub-passageway 102B can be directed at a cutting edge 36 associated with the cutting portion 30 and/or workpiece (not shown).

It has been found that application of pressurized coolant, in particular for pressures above 20 bar, is more effective when a only single passageway 24 to an associated cutting portion 30 is utilized. It has also been found that directing coolant to the cutting edge 36, adjacent a rake face 38, as shown in FIG. 1B, is more effective than directing coolant to the cutting edge 36, adjacent a relief surface 40 thereof. Accordingly, in the non-limiting example shown, the blade outlet aperture 28 is located at a portion of the cutting portion 30 that is closer to the first longitudinal mounting edge 92A than to the first end edge 94A.

While the example above relates to a blade passageway 24 with a uniform cross-sectional area, it will also be understood that it is possible to decrease the cross sectional area of the blade passageway 24 with increased proximity to the cutting portion 30, with a different possible advantage of increasing the speed of coolant passing therethrough. However, it has been found that limiting a ratio of the magnitudes of a maximum cross-sectional area, closer to the blade inlet aperture, and a minimum cross-sectional area, closer to the blade outlet aperture, to 2:1 or less can ensure maintenance the simple construction of the exemplified parting blade.

The description above includes an exemplary embodiment and details for enablement of claimed subject matter, and does not exclude non-exemplified embodiments and details from the claim scope of the present application.

What is claimed is:

1. An elongated parting blade having unitary one-piece construction and comprising:
   opposing first and second side surfaces extending between parallel first and second longitudinal mounting edges and between opposing first and second end edges which extend transverse to the longitudinal mounting edges;
   each of the first and second longitudinal mounting edges comprises a tapered shape configured to facilitate longitudinal sliding motion of the parting blade, when the parting blade is retained by a blade holder;
   a cutting portion which is associated with the first longitudinal mounting edge and the first end edge; and
   a blade passageway configured for conveyance of coolant and extending
      from a blade inlet aperture formed in at least one of the side surfaces, the blade inlet aperture being closer to the second longitudinal mounting edge than to the first longitudinal mounting edge and the blade inlet aperture being located between the first and second longitudinal mounting edges,
      to a blade outlet aperture located at the cutting portion, the blade outlet aperture being closer to the first longitudinal mounting edge than to the second longitudinal mounting edge;
   wherein:
   the blade outlet aperture is located in the cutting portion so as to direct coolant to pass above a rake surface and towards a forward cutting edge of a cutting insert, when a cutting insert is retained in the parting blade.

2. The parting blade according to claim 1, being configured for conveyance of coolant at a pressure of 120 bar or greater.

3. The parting blade according to claim 1, wherein the blade outlet aperture is located at a portion of the cutting portion that is closer to the first longitudinal mounting edge than the first end edge.

4. The parting blade according to claim 1, wherein the blade passageway has a uniform cross-sectional area perpendicular to a coolant path extending therethrough.

5. The parting blade according to claim 1, wherein the blade inlet aperture opens out to both of the first and second side surfaces.

6. The parting blade according to claim 1, further comprising an additional cutting portion.

7. The parting blade according to claim 1, further being symmetrical about a bisecting plane extending parallel with and equally spaced from the first and second side surfaces.

8. The parting blade according to claim 1, further having 180 degrees rotational symmetry about a blade axis that extends through the center of, and in a direction perpendicular to, the first and second side surfaces, or further having mirror symmetry about a lateral plane extending perpendicular to the first and second side surfaces and located midway between the opposing first and second end edges, thereby resulting in a double-ended parting blade which is not rotationally symmetric about a blade axis that extends through the center of, and in a direction perpendicular to, the first and second side surfaces.

9. The parting blade according to claim 1, wherein a width $W_y$ of the blade passageway is greater than 50% of a width $W_p$ of the parting blade ($W_y > 0.5\ W_p$).

10. The parting blade according to claim 1, wherein the first and second side surfaces are planar.

11. A blade holder comprising
a blade seat comprising a holder connection surface and upper and lower longitudinal jaws disposed on opposing sides of the holder connection surface, wherein:
  each longitudinal jaw comprises a slanted biasing surface,
  the upper longitudinal jaw is attached to a remainder of the blade holder via at least one mounting bore formed therein and secured with a screw, and
  the lower longitudinal jaw has one-piece unitary construction with said remainder, and
a holder passageway configured for conveyance of coolant and comprising a coolant path extending therethrough, from at least one holder inlet aperture to at least one holder outlet aperture formed at the holder connection surface, any and all holder outlet apertures being located closer to the lower longitudinal jaw than to the upper longitudinal jaw;
the holder passageway comprises a preceding portion and a deceleration chamber closer than the preceding portion to the holder outlet aperture, and a transition region at which the preceding portion transforms into the deceleration chamber;
in the preceding portion at the transition region, the holder passageway has a preceding portion cross-sectional area extending perpendicular to the coolant path, in the deceleration chamber at the transition region, the holder passageway has a deceleration chamber cross-sectional area extending perpendicular to the coolant path, wherein:
the deceleration chamber cross-sectional area is greater than the preceding portion cross-sectional area; and/or the deceleration chamber comprises a barrier surface facing the coolant path of the preceding portion at the transition region;
the holder connection surface is formed with a sealing element recess that surrounds the holder outlet aperture; and
a sealing element is mounted in the sealing element recess.

12. The blade holder according to claim 11, wherein the deceleration chamber's cross-sectional area is at least 1.5 times as large as the preceding portion's cross-sectional area.

13. The blade holder according to claim 11, wherein the deceleration chamber opens out to the holder outlet aperture.

14. The blade holder according to claim 11, wherein the coolant path comprises a change of direction from the holder inlet aperture to the holder outlet aperture.

15. The blade holder according to claim 14, wherein the change of direction from the holder inlet aperture to the holder outlet aperture is a quarter turn.

16. The blade holder according to claim 14, wherein the change of direction from the holder inlet aperture to the holder outlet aperture occurs at the deceleration chamber.

17. The blade holder according to claim 14, wherein there is only one change of direction of the coolant path of the blade holder.

18. The blade holder according to claim 11, wherein one or more of (a) the sealing element recess, (b) a sealing element configured to fit in the sealing element recess, and (c) the holder outlet aperture is elongated along a longitudinal direction of the blade holder.

19. The blade holder according to claim 11, wherein defined between the sealing element recess and the holder outlet aperture is a holder outlet aperture wall.

20. The blade holder according to claim 11, wherein a smallest dimension of the deceleration chamber extends from the transition region to the barrier surface.

21. The blade holder according to claim 11, configured to convey coolant at a pressure in excess of 20 bar.

22. The blade holder according to claim 11, configured to convey coolant at a pressure of 120 bar or greater.

23. The parting blade according to claim 1, having only a single blade outlet aperture located at the cutting portion.

24. The parting blade according to claim 1, wherein the blade passageway comprises a straight first sub-passageway extending to the blade inlet aperture and a straight second sub-passageway starting at the blade outlet aperture and extending to the first sub-passageway.

25. The parting blade according to claim 24, wherein the second sub-passageway intersects the first sub-passageway at an obtuse angle.

26. The parting blade according to claim 24, wherein the first sub-passageway is directed from the blade inlet aperture in a direction of the first longitudinal mounting edge.

27. The parting blade according to claim 1, wherein the cutting portion of the parting blade comprises an insert seat configured to retain an insert, the insert seat having unitary one-piece construction with the parting blade.

28. The parting blade according to claim 1, wherein the tapered shape comprises slanted surfaces.

29. The blade holder according to claim 11, further comprising exactly two holder outlet apertures, exactly two sealing element recesses and exactly two sealing elements, one sealing element mounted in each sealing element recess.

30. The blade holder according to claim 11, wherein:
  the upper longitudinal jaw is attached by plurality of screws coupled to a corresponding plurality of mounting bores formed in said remainder; and
  the plurality of screws and mounting bores are directed in a direction towards the deceleration chamber.

* * * * *